Patented Jan. 31, 1939

2,145,316

UNITED STATES PATENT OFFICE 2,145,316

PROCESS FOR THE DEODORIZING OF SPENT SULPHURIC ACID

Gustave T. Reich, Philadelphia, Pa.

No Drawing. Application July 29, 1935, Serial No. 33,707

4 Claims. (Cl. 23—172)

My process has to do with the restoring to sulphuric acid its deodorizing power, which was spent by its use for deodorizing gases, particularly $CO_2$ in a gaseous state.

In the manufacture of gases, especially the manufacture of $CO_2$, many methods are known whereby the odorous substances in the gas being manufactured, are removed by means of various chemicals. Such a process is described in my U. S. Patent No. 1,519,932, dated December 16, 1934.

I have found that while $H_2SO_4$ had previously been used for dehydration of gases, it could, under certain conditions, be used also as a deodorant and for the absorption of odorous substances present in the gas. These odorous substances may be in their original condition, but are for the most part oxidized by various chemicals such as hexavalent chromium compounds or permanganate compounds. This discovery I have set fort in the specification of the Patent No. 1,519,932.

Generally, however, $H_2SO_4$ has been known and used only for dehydrating purposes. I have found that in my process for deodorizing the gas by the use of $H_2SO_4$ described above, and consequently probably in other processes, where $H_2SO_4$ is used under pressure as a deodorant, it acts only in a minor capacity as a dehydrating agent. I have found that in most instances an acid having a specific gravity of 66 Bé. is diluted only one degree or two degrees Bé. when, from a deodorization standpoint, it is completely exhausted.

It was customary, up to now, if the $CO_2$ gas had been obtained by the fermentation of saccharine materials such as molasses, to apply the exhausted sulphuric acid for the inversion of the sucrose or to dispose of it in the open market at a considerable loss.

The distilling industry, fermenting grains or similar materials, does not require sulphuric acid, except for dehydrating and deodorizing $CO_2$. Therefore, the sulphuric acid, when it has ceased to have deodorizing power is useless to it, and must be disposed of at great loss. This loss of deodorizing power requires that much more acid is needed than in my process, and its disposal is indeed a very great problem.

By my process, the restoring to $H_2SO_4$ its deodorizing power may be accomplished very economically and may be repeated upon the identical body of acid a very large number of times. In cases where the dilution of $H_2SO_4$ is comparatively slight, the restoration of the deodorizing power of the acid may be accomplished, and the acid used to deodorize, without dehydrating the acid, and the acid reused at its reduced concentration, or both the dehydration of the acid and the restoration of its deodorizing power may be accomplished, either simultaneously or successively.

The primary step in my process is the carbonization—charring—of the organic materials contained in the acid. This is effected by the carbonization of the organic impurities contained in the contaminated acid. This may be done in an $H_2SO_4$ concentrator. The contaminated acid is heated to a temperature above 100° C.; and maintaining this temperature for a sufficiently long time to carbonize (char) these impurities. The step may be performed at atmospheric pressure or in a vacuum. Ofter these impurities have been decomposed (which decomposition should be complete, or at least completed substantially) the char remains in the acid as a suspension in a very fine colloidal state. This char will not interfere with the deodorizing power of the acid. In fact, it will increase it. If the other components of the impurities in the $H_2SO_4$ volatilize and pass off or should not affect the deodorizing power of the $H_2SO_4$ adversely, the acid, with the colloidal char, may be used without further processing. If the accumulation of char becomes too great for convenient handling of the acid, the char may be removed by filtering, centrifuging or other means.

Ordinarily, however, the vapor products resulting from the carbonization of the organic impurities do not free themselves sufficiently completely from the acid. I therefore pass through the sulphuric acid some neutral or indifferent gas that will carry off mechanically these volatile impurities. This gas may be air, purified $CO_2$, &c., and is applied through intimate countercurrent passage of the gas through the $H_2SO_4$, while the latter is cooling. This treatment, ordinarily, will remove the last trace of impurities from the acid. The purified and cooled acid may then be used in the purification system for deodorization purposes. The sulphuric acid may be cooled by water, and also by the passing through it of the current of air or purified $CO_2$.

The completion of the step of purification is a function of three quantities, time of heating, temperature and volume of the air or gas passing through the acid. The sulphuric acid thus cooled and/or concentrated can then be transferred to the purification system, serving for the deodorization of new $CO_2$.

I find that this acid can be used repeatedly after the first exhaustion of its deodorizing powers, provided the acid is cooled in the above manner. I have found also, that after several revivals of the deodorizing power of the acid, it may contain a high percentage of finely divided char. This char may be removed by filtration, either from the hot or cold acid, through an acid resisting material, such as asbestos or fused silica or any similar material.

*Example 1.*—The acid, having been used to deodorize $CO_2$ gas, as described in my Patent No. 1,519,932, and having absorbed odorous organic materials, partly in their unaltered condition and partly oxidized by chemicals such as hexavalent chromium compounds, and having been diluted only say from 66 to 64 degrees Bé. but having lost all its deodorizing power, is heated to somewhat above 100° C. (in a closed vessel). This will cause the organic impurities to carbonize, but will not dehydrate the acid. The acid will lose its odor, will become dark colored and usually opaque. As the acid cools, a blast of air is driven through the acid and this is continued until the volatile materials formed by the charring are driven out from the acid. The acid is then used again. Its slightly greater dilution (say to 64 Bé.) does not interfere with the dehydration necessary; its deodorizing power is fully operative. This reuse of the acid proceeds until the deodorization power is again exhausted, but the dehydrating power is only slightly impaired (the dilution becoming say to 62 degrees Bé.) when the acid is again treated as above. This continues until the acid becomes so dilute that it must be dehydrated. The very great saving in the amount of acid required is obvious. Instead of being obliged to dispose of acid that has lost its deodorizing power, after each phase of the process, a comparatively simple treatment of the acid permits the repeated use of the same acid, and no additional acid need be purchased except to supply losses by waste.

*Second example.*—Acid like the first may be heated and air may be blown through it while it is being heated.

*Third example.*—Acid may be concentrated by heating to a temperature sufficiently high to concentrate it, which will also char the impurities. This will char the organic materials it has collected by deodorizing $CO_2$ and air may be blown through it while it is at the dehydrating heat or afterwards or both while at the heat of concentration and afterwards.

*Fourth example.*—In any of the above, the hot acid may be made to drip from one pan to a lower pan and the air being driven through the flow between the pans or through the material collected in the pan. Certain advantages of cooling the acid and the collection or partial elimination of the char is obtained.

*Fifth example.*—The cooling of the acid may be accomplished solely by passing through it air or purified $CO_2$.

In any example the charring can be carried out at or below atmospheric pressure.

Many other details and changes in carrying out my process will be obvious to a chemical worker, and hence I do not limit myself by the description of any of the examples of ways of carrying out my process above set forth for anything less than the claims.

I claim:—

1. The process of purifying sulphuric acid that has become contaminated with malodorous organic compounds containing carbon, which comprises heating the contaminated acid, while excluding materials capable of reacting with the impurities, to a temperature above 100° C. maintaining said acid at such temperature until the carbon in said malodorous organic compounds is dissociated from the other elements of said compounds, and then cooling the acid and during said cooling removing said other elements dissociated from the carbon by passing through the acid an indifferent gas, and retaining the carbon in a free condition in the acid.

2. The process of purifying sulphuric acid that had become contaminated with oxidized malodorous organic compounds containing carbon, which comprises heating the contaminated acid excluding meanwhile all oxidizing materials from said acid capable of reacting with the oxidized impurities, to above 100° C., maintaining the acid at this temperature until the carbon in said organic malodorous compounds is dissociated from the malodorous materials, and the materials other than the carbon are vaporized, cooling the acid and then driving out the vaporized malodorous material by passing air through the acid, thereby keeping the carbon in the acid in a free state.

3. The process of purifying sulphuric acid that had been contaminated with malodorous oxidized organic compounds containing carbon and other elements, comprising heating the contaminated acid in the absence of a gas capable of reacting with the oxidized compounds, to a temperature over 100° C., maintaining the acid at this temperature until the carbon is dissociated from the other elements and the malodorous elements are volatilized, and partly separated from the acid and then cooling the acid and while cooling the acid blowing out the remaining volatilized malodorous materials by passing through the acid an indifferent gas, thereby retaining said carbon in the acid in a free state.

4. The process of purifying sulphuric acid that had been contaminated with oxidized malodorous organic compounds containing carbon, comprising heating the acid to a temperature above 100° C., maintaining this temperature until a dissociation and separation of the carbon from the malodorous materials and a distribution of the free carbon throughout the acid is accomplished and then cooling the acid and during said cooling by a blast of air expelling the materials of the malodorous compounds that had been separated from the carbon and retaining the carbon in a free state, distributed in small particles throughout the body of the acid.

GUSTAVE T. REICH.